July 10, 1945.  L. E. HICKS  2,380,309
VEHICLE STABILIZER
Filed May 22, 1943  2 Sheets-Sheet 1

Inventor
Louis E. Hicks

By [signature]

Attorney

July 10, 1945.  L. E. HICKS  2,380,309
VEHICLE STABILIZER
Filed May 22, 1943  2 Sheets-Sheet 2
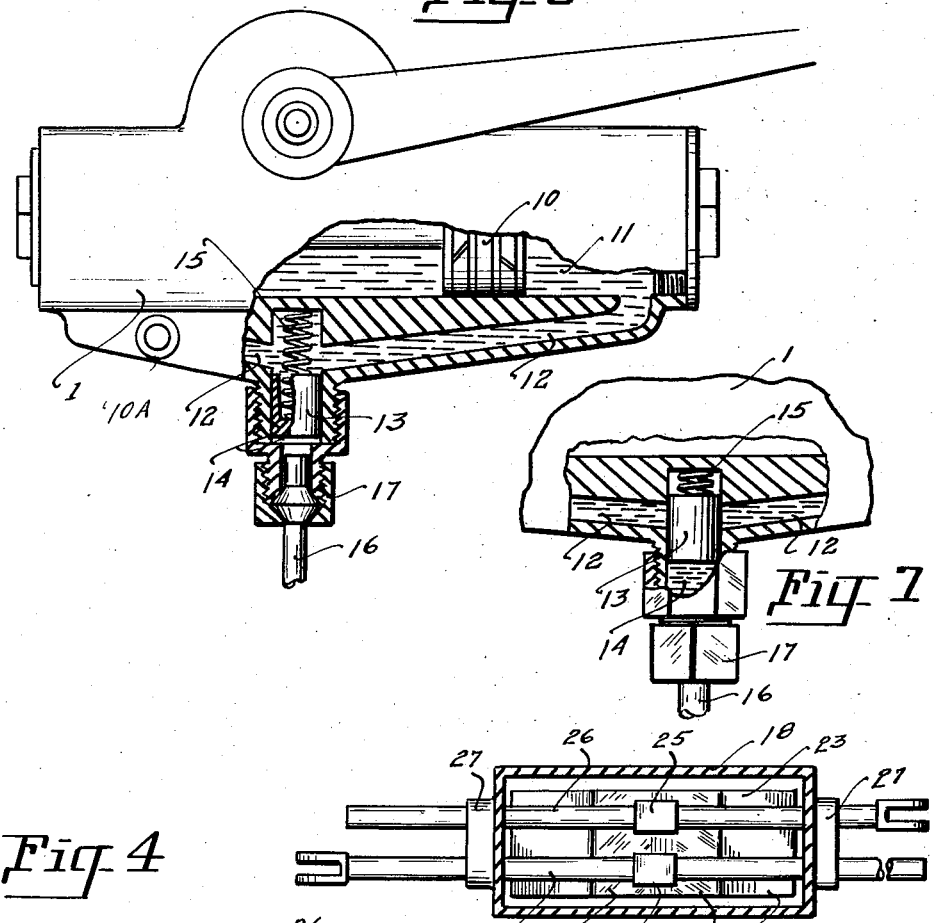
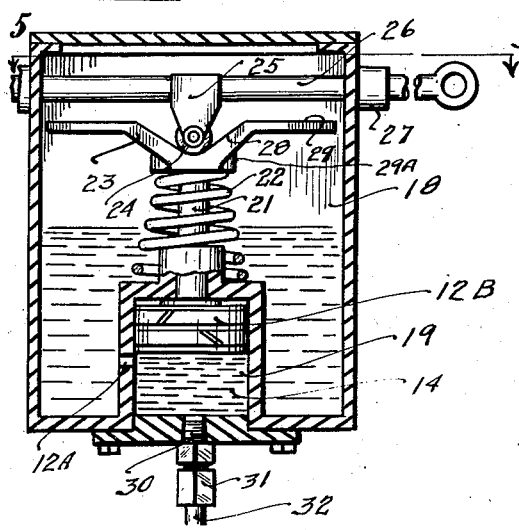
Inventor
Louis E. Hicks Patented July 10, 1945

2,380,309

UNITED STATES PATENT OFFICE 2,380,309

VEHICLE STABILIZER

Louis E. Hicks, Portland, Oreg.

Application May 22, 1943, Serial No. 488,086

6 Claims. (Cl. 188—2)

This invention relates to improvements in devices for stabilizing vehicle bodies.

The primary object of the invention is to provide a device for locking the shock absorbers on motor vehicles, such as automobiles, trucks, buses and the like.

In the operation of motor vehicles, when the brakes are suddenly applied the front end of the vehicle noses downward, causing the vehicle to bounce and in many cases renders the vehicle out of control, causing the vehicle to skid.

Further in the operation of a motor vehicle on making a sharp turn the vehicle will sway, therefore, a further object of my invention is the reducing of side sway of the vehicle.

By the use of my new and improved stabilizer, a smoother operating vehicle is created, furthering the safety of the vehicle and the smoothness of the ride.

These and other incidental objects will be apparent in the drawings, specification and claims.

Referring to the drawings:

Figure 4 is a sectional view of Figure 2, illustrating the control device in neutral position.

Figure 5 is a sectional view, taken on line 5—5 of Figure 4 illustrating the operating cams within the device.

Figure 6 is a side elevation of a shock absorber illustrating a fluid locking valve therein, parts broken away for convenience of illustration.

Figure 7 is a fragmentary view of Figure 6, illustrating the valve in closed position, obstructing the flow of fluid within the shock absorber, holding the shock absorber in an inoperative position.

In the drawings:

Figure 1:
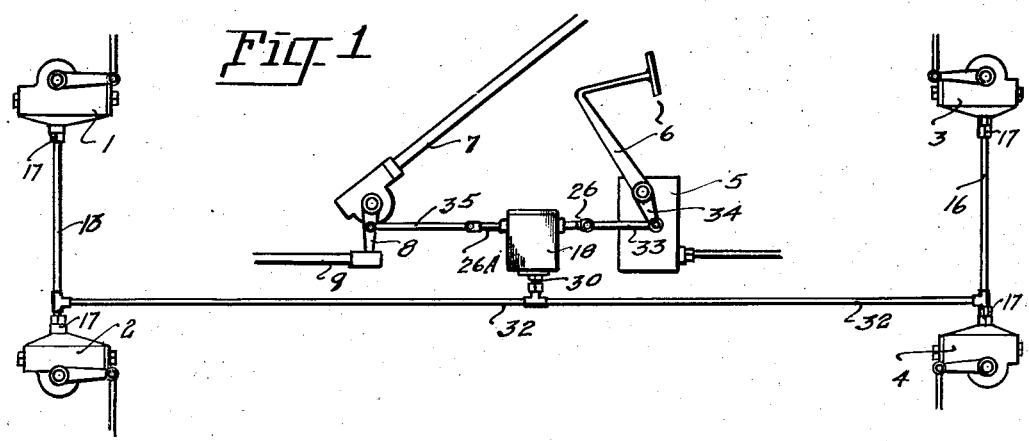
Figure 1 is a diagrammatical lay out of my new and improved stabilizing device as connected to the shock absorber system of a motor vehicle.

The shock absorbers of a motor vehicle are illustrated diagrammatically at 1, 2, 3 and 4. Any type of shock absorber may be controlled by my new and improved stabilizer. I illustrate the brake cylinder of a vehicle at 5, having the usual brake pedal 6 connected thereto. The steering mechanism of the vehicle is illustrated at 7, 8 and 9, and forms part of the stabilizing system, together with the brake assembly 5, to be described later.

Referring to Figures 6 and 7, the shock absorber piston 10 works within the cylinder 11 and has the usual liquid working therein against the piston and controlled by the by-pass valve 10A of any suitable well known type. My invention consists of preventing the flow of fluid through the by-pass 12 from one side of the piston to the other. When it is desired to lock the shock absorber against movement a suitable valve 13 closes the by-pass 12, as illustrated in Figure 7. The operation of the valve 13 is caused by the liquid 14 forcing the valve 13 across the by-pass 12, against the spring 15. This is accomplished by delivering the liquid 14 through the tubing 16 and tubing 32 from a hydraulic cylinder 19, located within a mechanically operated control box 18.

Figure 2:
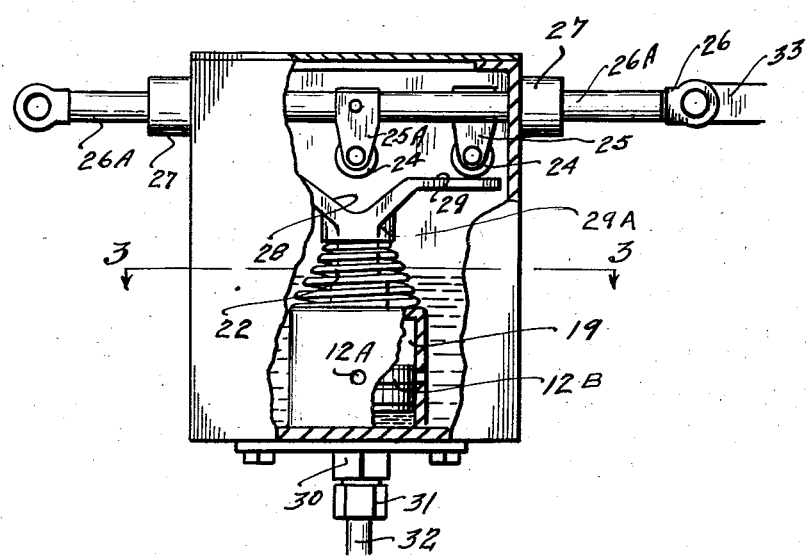
Figure 2 is an enlarged detail view of the operating control mechanism, partially broken away for convenience of illustration.
Figure 3:
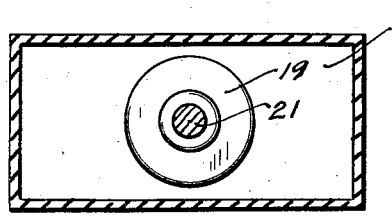
Figure 3 is a sectional view, taken on line 3—3 of Figure 2.

I will now describe the operation of the control box. A connecting link 33, having one of its ends connected to the arm 34 of the brake pedal 6, and its opposite end pivotally connected at 26 to the sliding cam rod 26A. Fixedly mounted to the cam rod is a bracket 25, which has a cam roller 24 rotatably mounted thereto. When the foot pedal 6 is pushed forward the link 33 will pull the cam rod 26A to the position shown in Figure 2. The roller 24 thereby contacts the cam surface 29 of the cross head 29A, the cross head 29A is fixedly mounted to the piston rod 21, and as the cam roller 24 is forced against the inclined surface 28 of the cross head it will force the cross head downward together with the piston rod and the piston 12B, forcing the liquid 14 within the cylinder 19 through the tubing, as heretofore described, forcing the valve 13 against the spring 15, closing the by-pass port 12 of the shock absorber preventing the movement of the piston 10 within the absorber, and thereby preventing the body of the vehicle from moving relative to the wheels of the vehicle, therefore, it can be readily understood when the brakes are applied and the shock absorbers are locked that the whole vehicle will become rigid relative to the spring suspension, preventing bouncing or nosing downward of the vehicle and thereby giving every advantage to the braking system of the motor vehicle.

I will now describe the operation of my device relative to the turning of the vehicle, showing how the vehicle can be prevented from swaying while making the turn. As the steering arm 8 is operated a link 35 connected thereto and to the cam rod 26A operates the cam wheel 24 carried by the bracket 25A over the cam surfaces 28 and 29 of the cross head 29A, forcing the fluid 14 by the piston 12B against the valve 13 within the shock absorber, as heretofore described, locking the shocks and preventing the vehicle from any side sway relative to the wheels of the same.

I have provided means of preventing sway of motor vehicles while making turns, and at the same time preventing bouncing of the vehicle when the brakes are applied, all automatically from the brake pedals and the steering device.

I do not wish to be limited to the exact mechanical construction as illustrated, as other forms of mechanical embodiment may be employed, still coming within the scope of my claims.

What I claim is:

1. The combination with a vehicle of the type having shock absorbers and controlling means, a stabilizer for creating fluid pressure in the actuation of either of a plurality of controlling means, said stabilizer including a plunger for creating fluid pressure, an operating member having independent faces, and elements cooperating respectively with each of said faces for depressing the plunger, a transversely operating member connected to each of said elements for operating the same, and a connection between each of said members and an independent controlling means for the vehicle.

2. A stabilizer for use in vehicles of the type including shock absorbers and vehicle controlling means, said stabilizer including a casing, a plunger in the casing for creating a fluid pressure, means for utilizing the fluid pressure for absorber cutoff function, a member connected to and serving to operate the plunger, independent elements respectively responsive to the operation of one of the controlling means, and means on each element to cooperate with and actuate the plunger operating means.

3. A vehicle of the type having a shock absorber and vehicle controlling means, in combination with a stabilizer including a cutoff operative in the shock absorber to interrupt the normal function of the shock absorber, a fluid conduit leading to and serving to operate the cutoff, a casing, a fluid body in the casing and conduit, a plunger serving when depressed to create pressure in said fluid body for operating the cutoff, a member in the casing for operating the plunger, said member having spaced independent operating faces, cam rods moving through the casing and each carrying an element to respectively cooperate with one of said faces, and a connection between each of the cam rods and independent vehicle controlling means.

4. A stabilizer for vehicle shock absorbers of the fluid type having a flow-restricting by-pass, said stabilizer including a pressure responsive element for controlling said by-pass to interrupt normal shock absorber action, and a single means common to all shock absorbers and operative from at least two distinctive directions for creating operative pressure on the elements of all shock absorbers.

5. A construction as defined in claim 4, wherein the single means is automatically responsive to selected operation of any one of a plurality of vehicle controlling means.

6. A construction as defined in claim 4, wherein the vehicle is of the type including braking means and steering means, and wherein the single means is automatically operative in selective actuation of either the braking or steering means.

LOUIS E. HICKS.